United States Patent Office 2,796,438
Patented June 18, 1957

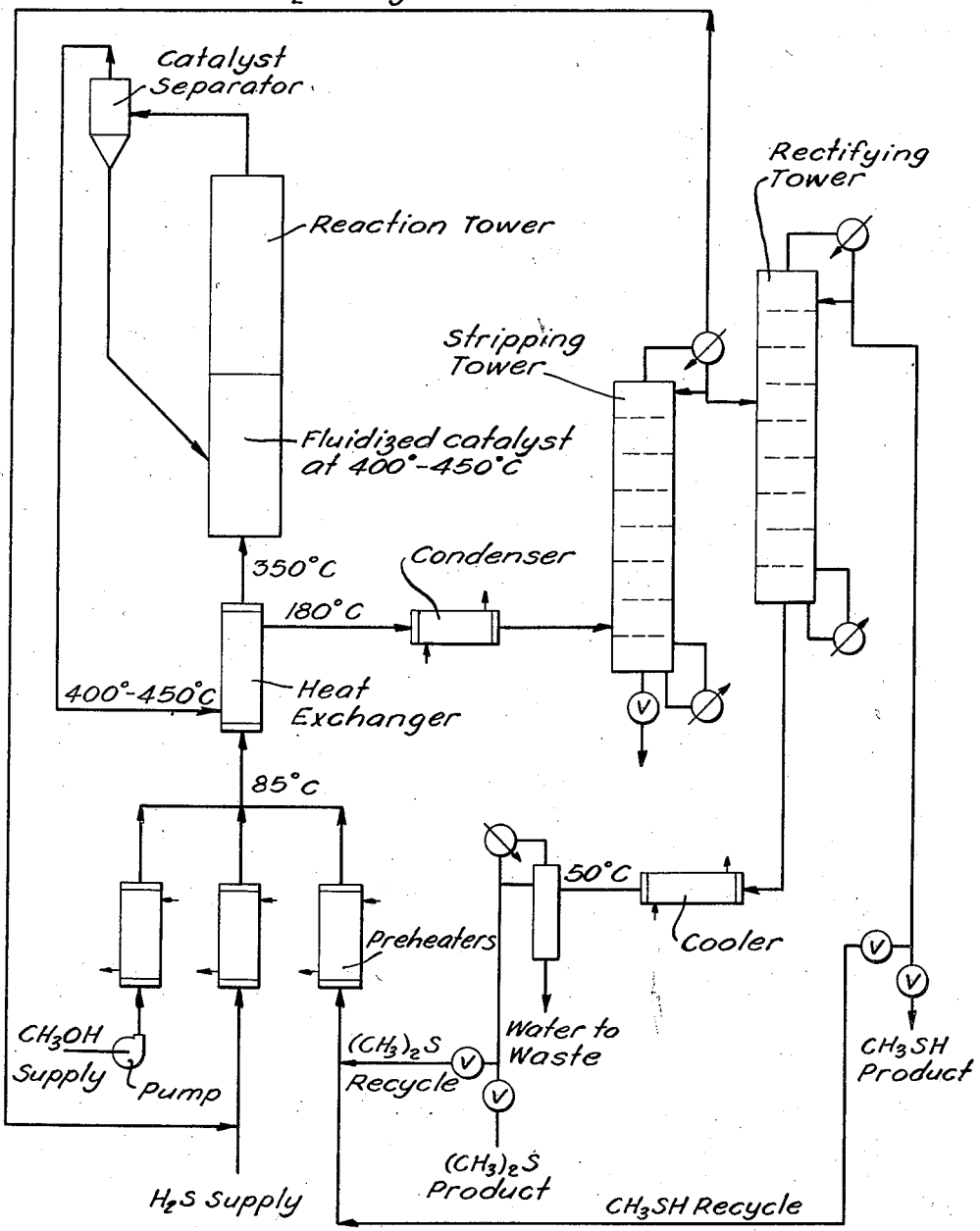

2,796,438

METHYL MERCAPTAN—METHYL SULFIDE PROCESS

Merritt W. Martin, Arcadia, and Guy H. Harris and Kenneth R. Oliver, Jr., Concord, Calif., assignors to The Dow Chemical Company, Midland, Mich., a corporation of Delaware Application June 19, 1953, Serial No. 362,752

2 Claims. (Cl. 260—609)

This invention relates to a process for the manufacture, in good yield, of methyl mercaptan or methyl sulfide, as desired.

It is known that primary monohydric alcohols react with hydrogen sulfide to produce the alkyl mercaptans and alkyl sulfides. The yields of mercaptan are usually low, and have been reported to vary according to the catalyst employed. Thus, Sabatier reported that thoria catalysts are seven times as effective as alumina in making higher alkyl mercaptans and later workers have reported yields of methyl mercaptan over thoria of only about 36 and 42 percent, with an average of about 15 percent of the methanol being converted to formaldehyde, at reaction temperatures of 380° and 370° C., respectively. (See Sabatier et al., Comptes rendus 150, 1217–1221 and 1569–1572 (1910), and Kramer et al., J. A. C. S. 43, 880–890 (1921)). The results reported in the literature clearly indicate that the reaction as practiced heretofore between methyl alcohol and hydrogen sulfide is not a commercially feasible means for making methyl mercaptan.

It is the principal object of this invention to provide a method whereby either methyl mercaptan or methyl sulfide may be made, as desired, in substantially theoretical yields.

The method of the present invention consists essentially in passing hydrogen sulfide and methanol vapor through a fluid bed of a metal oxide catalyst for the dehydration of alcohols, at a temperature from 400° to 450° C., separating methyl mercaptan from methyl sulfide, withdrawing one of them from the system, and recycling the other to the reaction zone. The preferred catalyst is activated alumina. Others which may be used are thorium oxide, zirconium oxide, uranium oxide, chromium oxide, and the blue oxides of tungsten and molybdenum.

A convenient apparatus for the commercial operation of the process is illustrated diagrammatically in the annexed drawing. Methanol vapor and an excess of preheated hydrogen sulfide are fed to the bottom of a fluid bed of catalyst which is kept at a reaction temperature of 400° to 450° C. The rates of feed are adjusted to keep the catalyst fluidized, and to give enough contact time in the reaction tower to convert substantially all of the methanol to mercaptan and sulfide. The effluent product stream is cooled and the mercaptan and sulfide are stripped from the by-product water and any trace of residual methanol. Unchanged hydrogen sulfide and recovered methanol (if any) may be recycled to the reaction zone. The mercaptan and sulfide are separated by fractional distillation and one of them is withdrawn from the system. All or part of the other sulfur compound may also be withdrawn as product, but it is preferable to recycle said other compound to the reaction vessel. Thus, if methyl mercaptan is the desired end product, the methyl sulfide is returned to the reaction tower and, from a net input of methanol and hydrogen sulfide there is a net output of methyl mercaptan and water. When the methyl sulfide is the desired product, the mercaptan fraction is returned to the reaction tower and, from a net input of methanol and hydrogen sulfide there is a net output of methyl sulfide and water. At the temperatures employed, the described process does not produce any aldehydes, and conversion of methanol to the desired sulfur compound is practically quantitative. Temperatures shown at various points on the annexed diagram are given merely as convenient illustrations, and not as limitations on the process.

In the specific example, 20 mols of methanol, 40 mols of recycled methyl sulfide and 40 mols of hydrogen sulfide (both new and recycled) were supplied at a steady rate each hour to a fluid bed of activated alumina (Aluminum Company of America, Grade F-10) which was maintained at a temperature of 445° to 450° C. There was obtained as product in the first hour over 18 mols, or 90 percent yield, of methyl mercaptan, using the system illustrated on the annexed flow sheet. Thereafter, the yield per hour was nearly 20 mols of mercaptan.

When, in the foregoing example, instead of recycling methyl sulfide to the reaction tower, the methyl mercaptan was returned to that zone and the methyl sulfide was withdrawn as product, there was obtained nearly the theoretical yield of 10 mols of methyl sulfide per hour. In this case, the total hydrogen sulfide flow was reduced from the prior 2:1 excess to a 3:2 excess over the amount of methanol being used.

At a fixed ratio of methanol to hydrogen sulfide, the ratio of methyl mercaptan to methyl sulfide originally produced and delivered to the stripping tower varies with the temperature in the reactor, in the following manner, using the same alumina catalyst:

| Reaction temperature, °C | 385 | 400 | 440 |
|---|---|---|---|
| Mols mercaptan/mol methyl sulfide | 0.435 | 0.731 | 0.922 |

The required contact time between the reagents and catalyst in the reaction tower decreases as the temperature is increased. Hence, for the most favorable reaction, and to minimize the depth of the catalyst bed, temperatures near the upper end of the 400° to 450° C. range are preferred.

We claim:

1. The method which consists essentially in passing hydrogen sulfide, methanol vapor and methyl sulfide together through a fluid bed of a metal oxide selected from the group consisting of activated alumina, thorium oxide, zirconium oxide, uranium oxide, chromium oxide and the blue oxides of molybdenum and tungsten, at a temperature from 400° to 450° C., and separating methyl mercaptan by rectification from the methyl sulfide-containing product stream.

2. The method claimed in claim 1, wherein the catalyst is activated alumina.

References Cited in the file of this patent

UNITED STATES PATENTS

| 2,565,195 | Bell | Aug. 21, 1951 |
| 2,647,151 | Bell | July 28, 1953 |
| 2,667,515 | Beach | Jan. 26, 1954 |